United States Patent
Reaves et al.

[15] 3,659,403
[45] May 2, 1972

[54] FLOATING FEEDER BEATER

[72] Inventors: Robert S. Reaves, Blue Springs, Mo.; Madel A. Bordelon, Cedar Rapids, Iowa

[73] Assignee: Allis-Chalmers Manufacturing Company, Milwaukee, Wis.

[22] Filed: June 1, 1970

[21] Appl. No.: 42,198

[52] U.S. Cl. .................................................56/10.2, 56/DIG. 15
[51] Int. Cl. ..............................................................A01d 41/02
[58] Field of Search....................56/DIG. 15, 10.2, 10.3, 16.4

[56] References Cited
UNITED STATES PATENTS 3,073,099    1/1963    Anderson ..............................56/10.2

Primary Examiner—Antonio F. Guida
Assistant Examiner—J. Q. Lever
Attorney—Kenneth C. McKivett, Charles L. Schwab and Robert B. Benson

[57] ABSTRACT

A power driven feeder beater for a combine and wherein the feeder beater is pivotally mounted in slots in the header of the combine so that the feeder beater can be raised up in said slots by an excess of material being handled without interfering with the drive of the beater.

7 Claims, 3 Drawing Figures

PATENTED MAY 2 1972

3,659,403

Inventors
Robert L. Reaves
Model A. Bordelon
By Kenneth Tuckwick
Attorney

FLOATING FEEDER BEATER

An object of this invention is to provide a combine harvester with a feeder beater positioned in advance of the threshing cylinder and wherein the feeder beater is capable of raising up relative to the header when a large volume of crop material is being handled.

A further object of this invention is to provide a floating feeder beater which is power driven in all positions thereof.

A further object of this invention is to provide a floating feeder beater and wherein the weight of the feeder beater is the biasing force tending to hold the feeder beater down on the crop being conveyed.

A further object of this invention is to provide a power driven floating feeder beater wherein the whole beater can raise or either end can raise while the opposite end does not raise.

A further object of this invention is to provide a pivotally mounted power driven feeder beater.

Other objects and advantages will become apparent in the following specification and the accompanying drawings wherein.

Figure 1:
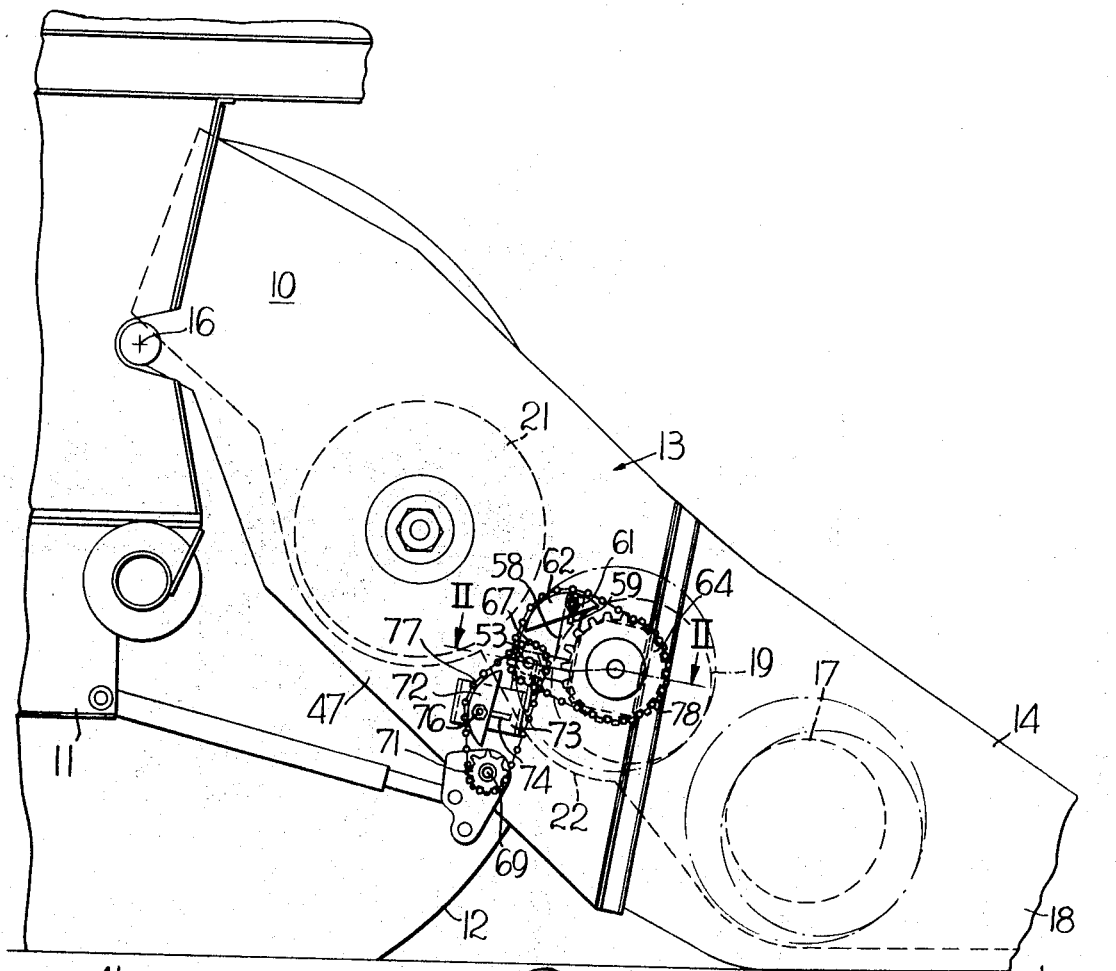
FIG. 1 is a right-hand side elevation view of a portion of a self-propelled combine harvester with some parts removed for clarity of illustration.

Referring to FIG. 1, a portion of a self-propelled combine harvester 10 is seen including a main frame 11 supported on a pair of transversely spaced traction wheels 12 (only one of which is shown) and a thresher housing 13 having a header 14 attached to the forward end thereof with such housing and header being pivotally mounted on frame 11 for pivotal movement about a transverse axis 16.

Header 14 includes the usual sickle cutter bar (not shown) carried at the forward end thereof, an auger 17 rotatably supported in sidewalls 18 of header 14 and positioned in crop receiving relation to the cutter bar. Auger 17 moves the cut crops transversely to a midportion of header 14 where the auger is provided with means (shown in dot and dash lines) for moving the harvested crop rearwardly and upwardly to a feeder beater 19 which in turn moves the crop material to a threshing cylinder 21 which in turn deposits the threshed crop material rearwardly onto a separating mechanism (not shown).

Figure 2:
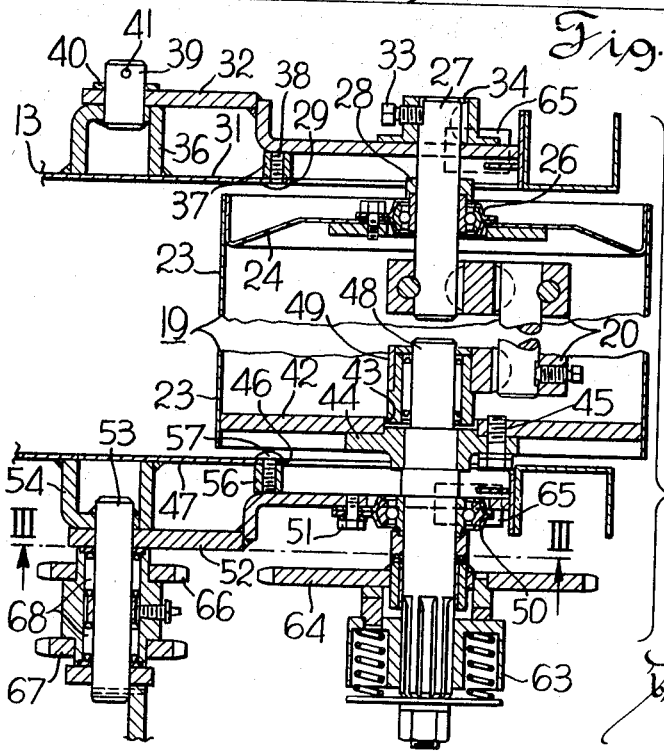
FIG. 2 is an enlarged section view taken on line II—II OF FIG. 1.

Feeder beater 19 is provided with disappearing finger mechanism 20 (see FIG. 2) for raking harvested material rearwardly over the floor 22 (see FIG. 1) of thresher housing 13 to the threshing cylinder 21. Referring to FIG. 2, feeder beater 19 is provided with a roll portion 23 which is attached at its left-hand side to a disk 24 having the center portion thereof bolted to a bearing assembly 26 which is mounted for rotation relative to a nonrevolving stub shaft 27. Shaft 27 is provided with a collar member 28 abutting bearing assembly 26 and which extends through an opening 29 in sidewall 31 of housing 13. The outboard end of shaft 27 is attached to a pivot member 32 by means of a cap screw 33 and half-moon key 34. Disappearing finger mechanism 20 is attached to the inboard end of shaft 27.

A bracket 36 is attached to sidewall 31 as by welding. A reinforcement member 37 is attached to sidewall 31 as by cap screws 38. A stub shaft 39 is attached to bracket 36 as by welding and pivotally mounts pivot member 32 thereon which is retained on shaft 39 by means of washer 40 and pin 41. Member 37 contacts the surface of pivot member 32 which opposes sidewall 31.

Figure 3:
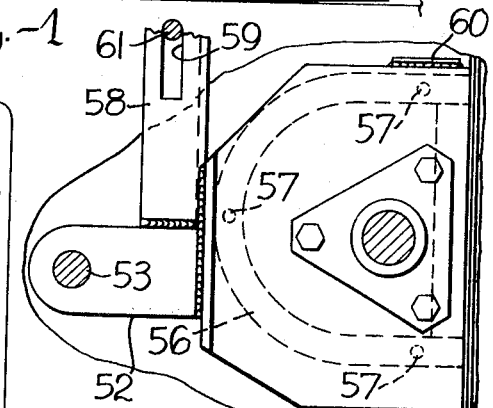
FIG. 3 is a section view taken on line III-III of FIG. 2.

Roll portion 23 is attached at its right-hand end to a disk member 42 which is provided with a central opening 43 in which is received a portion of a collar member 44. Collar member 44 is attached to disk 42 by means of bolts 45. The outer portion of collar member 44 extends through an opening 46 in sidewall 47 of housing 13. A stub shaft 48 is received in collar 42 for rotation therewith. The right-hand end of disappearing finger mechanism 20 has a bearing 49 interposed between it and shaft 48 to permit shaft 48 and roll 23 to rotate relative to the finger mechanism 20. Shaft 48 is supported by a bearing 50 which is attached by bolts 51 to a pivot member 52 which is pivotally mounted on a stub shaft 53, mounted on bracket 54, carried by sidewall 47. Sidewall 47 also has reinforcement member 56 attached thereto by means of cap screws 57. Reinforcement member 56 is horseshoe shaped similar to reinforcement member 37 which is attached to sidewall 31. Referring to FIG. 3 pivot member 52 is provided with upper and lower stop members 60 and 65 which coact with reinforcement members 37 and 56 for limiting the raising and lowering movement of the feed roll 19. Pivot member 52 can pivot counterclockwise about pin 53 until stop member 65 contacts reinforcement member 56 and pivot member can pivot in the opposite direction until stop member 60 contacts reinforcement member 56. Pivot member 32 is also provided with similar acting stop members coacting with reinforcement member 37 to limit the raising and lowering of roll 19. An angle member 58 is attached to a midportion of pivot member 52. Angle member 58 is provided with a slot 59 (see FIG. 3) for receiving a bolt 61 for adjustably mounting a chain tightening block 62 (see FIG. 1) thereon. A spring loaded slip clutch mechanism 63 (see FIG. 2) splined to shaft 48 provides an overload release between shaft 48 and sprocket 64 mounted thereon.

Stub shaft 53 has a double sprocket 66, 67 mounted thereon with needle bearings 68 interposed between the double sprocket and shaft 53. It is to be noted that stub shaft 53 is transversely aligned with stub shaft 39 so that roll 19 can pivot about the centers of these two stub shafts.

Referring to FIG. 1, a transversely extending power shaft 69 is rotatably supported on a lower portion of housing 13 and shaft 69 has a sprocket 71 attached to the right-hand end thereof. An adjustable chain tightening block 72 is adjustably mounted on a bracket 73 carried by wall 47. Bracket 73 is provided with a slot 74 along which block 72 may be adjusted by a tightening or loosening of bolt 76 which is positioned in slot 74 for this adjusting purpose. A chain 77 drivingly connects sprocket 71 with sprocket 67 with block 72 providing the proper tension in chain 77. Sprocket 67 is directly connected to sprocket 66 so accordingly the two are driven as one. Chain 78 drivingly connects sprocket 66 with sprocket 64. Block 62 insures that the desired degree of tension is obtained in chain 78.

The manner in which feeder beater 19 can automatically raise up if it is handling an excessive amount of material is as follows:

The excessive material will act against the lower portion of roll 23 of beater 19 causing pivot members 32 and 52 to pivot counterclockwise about stub shafts 39 and 53 until the beater is prevented from further pivotal movement by stop members 65 (see FIG. 3) contacting the lower surfaces of reinforcement members 56 and 37. When the overload of material has been passed on to threshing cylinder 21 by beater 19, beater 19 will return to the position shown in FIG. 1 for operation with a normal thickness blanket of material being presented to beater 19 with a lower limit being provided when stop members 60 contact reinforcement members 56 and 37. It should be noted that as beater 19 pivots upwardly as moved by an excess of material, this in no manner changes the driving relationships for rotating the beater. The pivotal movement is about the axis of drive sprocket 66 with the chain 78, sprocket 64 and chain tightening block 62 all moving with the pivot members 32 and 52 so that a positive uncomplicated chain tightener 62 may be used as the chain length will not vary. The only time an adjustment of tightener 62 will be necessary is when wear of the parts has taken place.

The right-hand side and the left-hand side of feeder beater 19 can float up and down independent of each other dependent on where a bunch of excess material may be acting on the lower side of the feeder beater. This results in less strain on the feeder beater parts.

The embodiments of the invention in which an exclusive property or privilege is claimed are defined as follows:

1. In combination in a combine harvester having a pivotally mounted thresher housing including a pair of spaced apart sidewalls joined by a floor, a header mounted on the forward end of said housing, a threshing cylinder carried by said harvester, a feeder beater mounted in transversely extending relation to said housing in overlying proximate relation to said floor and in feeding relation to said cylinder, said feeder beater being pivotally supported from pivot members pivoted on transversely aligned stub shafts attached to said sidewalls to provide an axis substantially the same height as the axis of said beater when said heater is in its lowest position for permitting upward swinging movement of said feeder beater in transversely aligned openings in said sidewalls, and power means for driving said feeder beater.

2. The combination recited in claim 1 and wherein said means for driving said feeder beater includes a drive sprocket mounted on one of said stub shafts, a sprocket attached to said feeder beater, a chain tightening means attached to said member, a drive chain connecting said shaft sprocket to said beater sprocket and said contacting chain tightening means, said sprockets, chain and tightening means being so arranged that said beater may be raised up by an overload of material passing thereunder without a change in the driving relationships of said sprockets and chain tightening means.

3. The combination recited in claim 2 and wherein said chain tightener is positioned to maintain a driving relation between said shaft and said beater in all adjusted positions of said beater.

4. The combination recited in claim 3 and wherein said chain tightening means moves with said beater about said drive sprocket and thereby retains a driving tension in said chain.

5. The combination recited in claim 4 and wherein said chain tightening means lowers when said beater lowers to maintain a driving tension in said chain.

6. The combination recited in claim 5 and wherein a pair of stop members are attached to said pivot members for limiting the raising and lowering of said feeder beater.

7. The combination recited in claim 6 and wherein one end of said feeder beater can raise up responsive to material being moved under said beater independently of whether the other end of said beater raises up or not.

* * * * *